(12) United States Patent
Yamamoto

(10) Patent No.: US 12,529,945 B2
(45) Date of Patent: Jan. 20, 2026

(54) PROJECTOR ATTACHMENT APPARATUS AND PROJECTION SYSTEM

(71) Applicant: SEIKO EPSON CORPORATION, Tokyo (JP)

(72) Inventor: Akihiko Yamamoto, Yamagata-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 403 days.

(21) Appl. No.: 18/172,599

(22) Filed: Feb. 22, 2023

(65) Prior Publication Data
US 2023/0266647 A1    Aug. 24, 2023

(30) Foreign Application Priority Data

Feb. 22, 2022    (JP) .................................. 2022-025401

(51) Int. Cl.
*G03B 21/14*    (2006.01)
(52) U.S. Cl.
CPC ......... *G03B 21/142* (2013.01); *G03B 21/145* (2013.01)
(58) Field of Classification Search
CPC ............................ G03B 21/145; G03B 21/142
USPC ......................................................... 353/119
See application file for complete search history.

(56) References Cited

U.S. PATENT DOCUMENTS 4,352,124 A  *  9/1982  Kline ...................... H04N 9/31
                                                      348/744

FOREIGN PATENT DOCUMENTS

| JP | 07167382 A | * | 7/1995 |
| JP | 2006337850 A | | 12/2006 |
| JP | 2015-187681 A | | 10/2015 |
| WO | WO2006070869 A | | 7/2006 |

OTHER PUBLICATIONS

Partial Translation of JP07167382 (Year: 2025).*

* cited by examiner

*Primary Examiner* — Jerry L Brooks
(74) *Attorney, Agent, or Firm* — Dority & Manning, P.A.

(57) ABSTRACT

A projector attachment apparatus includes a fixing part including a first surface and a second surface that is an opposite surface of the first surface, and a rotating shaft part configured to support the fixing part to be rotatable from a first posture in which the second surface is horizontal to a second posture that is at a rotation angle different from a rotation angle in the first posture. The second surface is configured to be attached a projector. The second surface facing a vertical downward direction in the first posture, an axial direction of a projection axis of the projector tilts downward in a vertical direction with respect to a horizontal direction in the first posture, the second posture of the fixing part is a position rotated 90 degrees with respect to the horizontal direction in the second posture, and the axial direction of the projection axis tilts further upward in the vertical direction than a horizontal in the second posture.

7 Claims, 8 Drawing Sheets

PROJECTOR ATTACHMENT APPARATUS AND PROJECTION SYSTEM

The present application is based on, and claims priority from JP Application Serial Number 2022-025401, filed Feb. 22, 2022, the disclosure of which is hereby incorporated by reference herein in its entirety.

BACKGROUND

1. Technical Field

The present disclosure relates to a projector attachment apparatus and a projection system.

2. Related Art

There has been known a projector that optically projects projection light onto a projection surface. As such a projector, a projection apparatus capable of projecting a projection image in a horizontal direction and a vertical direction has been proposed in JP2006-337850A (Patent Literature 1).

However, in the projection apparatus disclosed in Patent Literature 1 described above, when projection light is projected vertically upward by the projector, the projection light is easily reflected on the eyes of an operator present near the projection apparatus. Therefore, an apparatus that projects light considering a projection direction has been demanded.

SUMMARY

According to an aspect of the present disclosure, there is provided a projector attachment apparatus including: a fixing part including a first surface and a second surface that is an opposite surface of the first surface; and a rotating shaft part configured to support the fixing part to be rotatable from a first posture in which the second surface is horizontal to a second posture that is at a rotation angle different from a rotation angle in the first posture. The second surface is configured to be attached a projector. the second surface facing a vertical downward direction in the first posture, an axial direction of a projection axis of the projector tilts downward in a vertical direction with respect to a horizontal direction in the first posture, and the second posture of the fixing part is a position rotated 90 degrees with respect to the horizontal direction in the second posture, and the axial direction of the projection axis tilts further upward in the vertical direction than a horizontal in the second posture.

According to an aspect of the present disclosure, there is provided a projection system including: the projector attachment apparatus described above; and the projector configured to project projection light.

DESCRIPTION OF EXEMPLARY EMBODIMENTS

Figure 1:
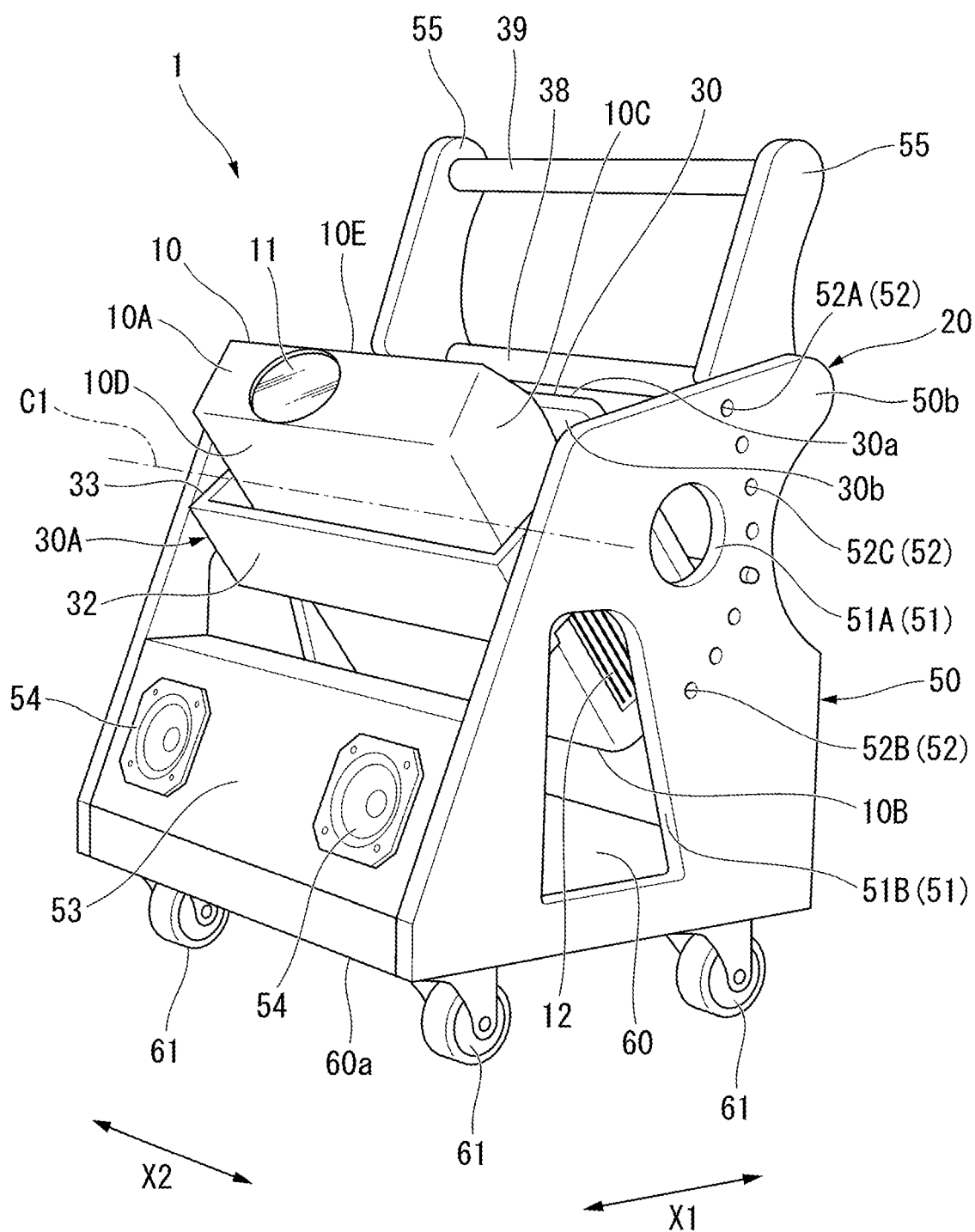
FIG. 1 is a perspective view of a projection system according to an embodiment viewed from an oblique front.

An embodiment of the present disclosure is explained below with reference to the drawing.

Note that, in the drawings referred to below, in order to clearly show components, some components are shown in different scales of dimensions.

Figure 2:
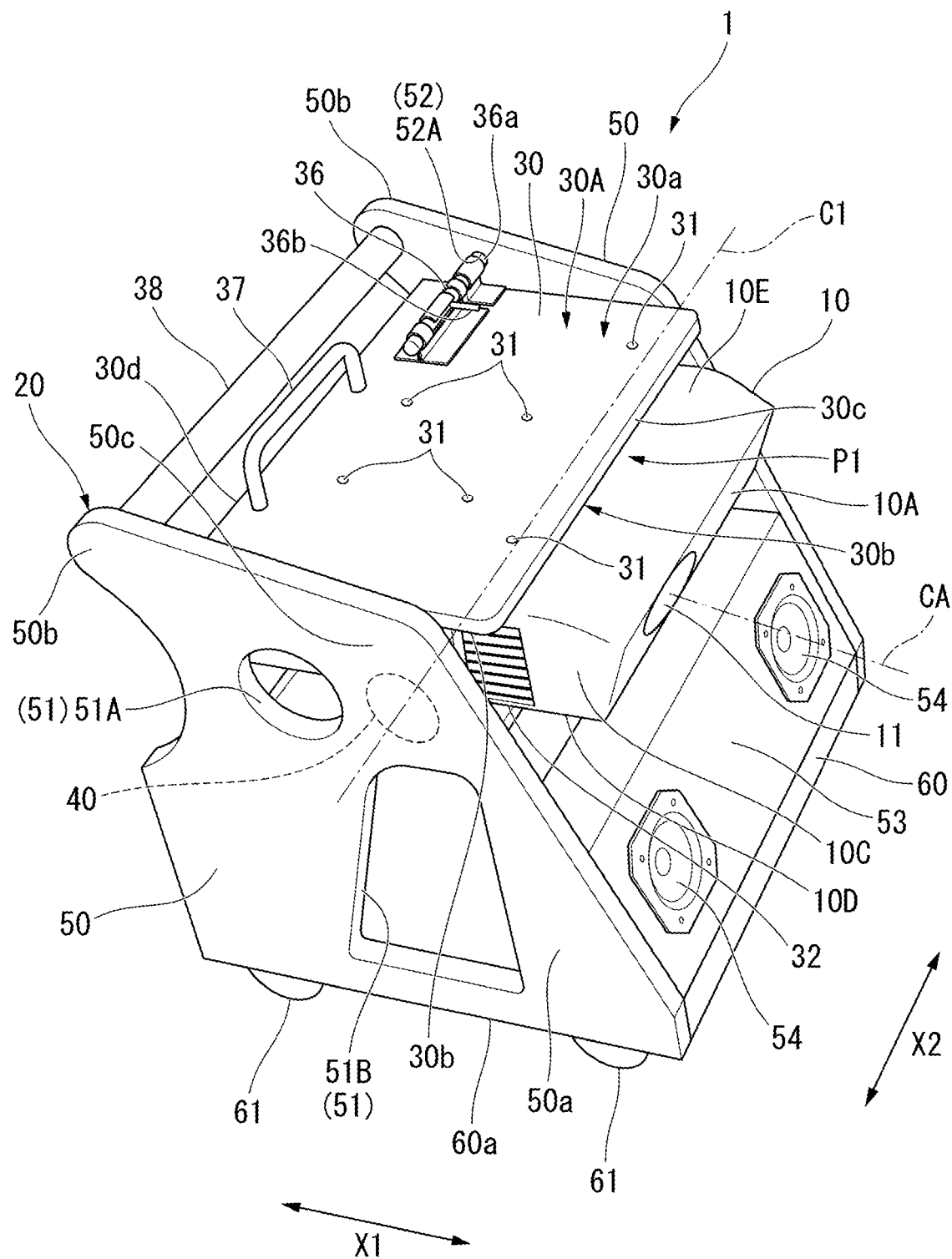
FIG. 2 is a perspective view of the projection system viewed from an oblique front at another angle.
Figure 3:
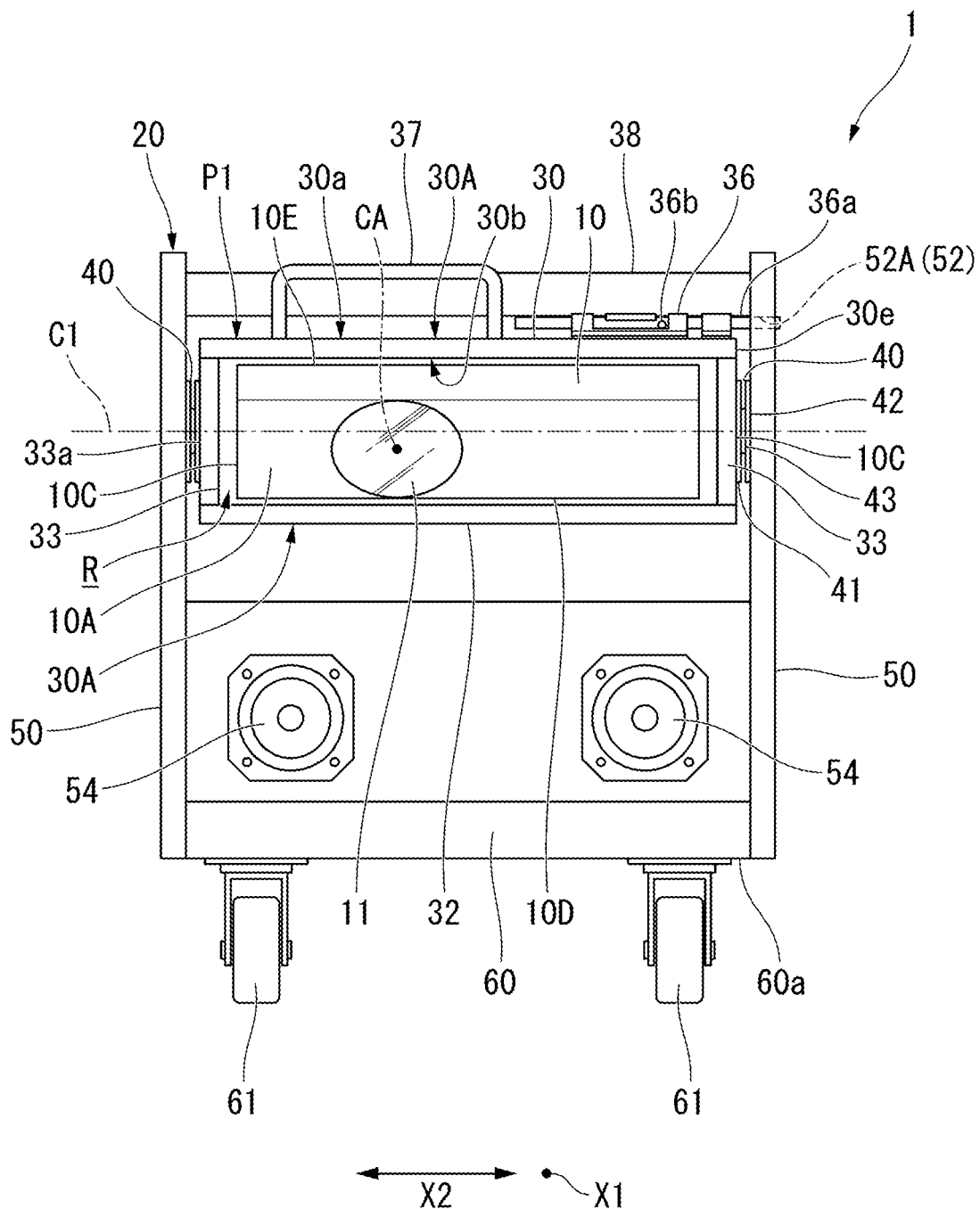
FIG. 3 is a front view of the projection system viewed from the front.
Figure 4:
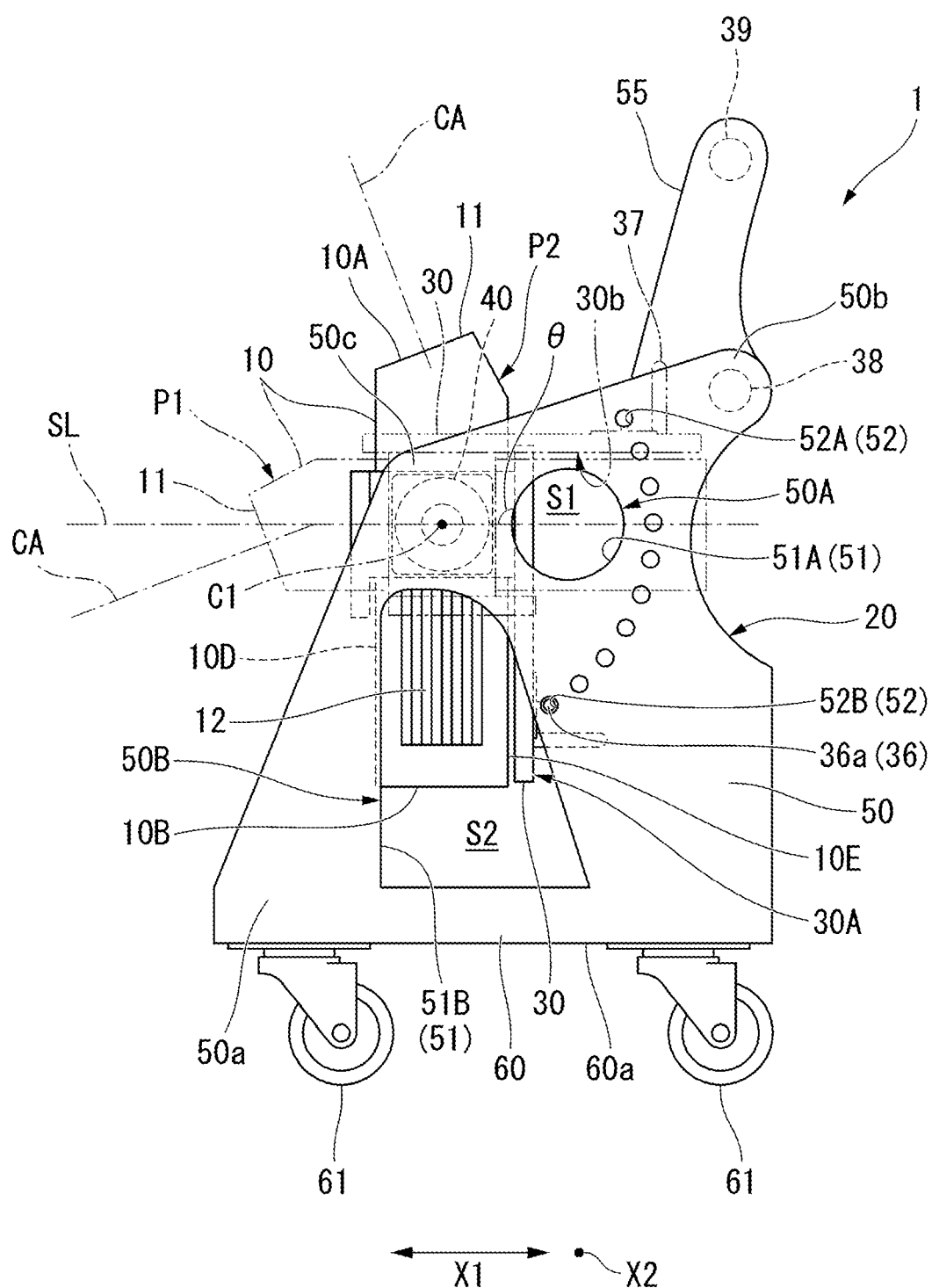
FIG. 4 is a side view of the projection system in which a side surface plate including an engaging hole is viewed from a side.

FIG. 1 is a perspective view of a projection system 1 including a projector attachment apparatus, to which a projector 10 is attached, according to the embodiment viewed from an oblique front. FIG. 2 is a perspective view of the projection system 1 viewed from an oblique front at another angle. FIG. 3 is a front view of the projection system 1 viewed from the front. FIG. 4 is a side view of the projection system 1 in which a side surface plate including engaging holes is viewed from a side. The projection system 1 in this embodiment includes the projector 10 that projects projection light and a projector attachment apparatus 20 in which the projector 10 can be set.

The projector 10 set in the projector attachment apparatus 20 can be carried by moving the projector attachment apparatus 20 with, for example, human power. That is, the projector attachment apparatus 20 is used when, only by moving the projector attachment apparatus 20 to a desired position, projection light is projected onto, for example, a screen or a wall surface such as a ceiling surface or a side surface in a room by the projector 10 on the projector attachment apparatus 20 without replacing the projector 10 from the projector attachment apparatus 20 to another place.

In the projector 10, a direction in which a projection lens 11 is disposed is referred to as front or a front side. A surface located on the front side in a housing of the projector 10 is referred to as a front surface. The projector 10 includes a front surface 10A, a rear surface 10B, a pair of side surfaces 10C, 10C, an upper surface 10D, and a lower surface 10E. In the projector 10, the rear surface 10B is opposed to the front surface 10A. A direction in which the rear surface 10B is disposed is referred to as rear or a rear side.

Figure 5:
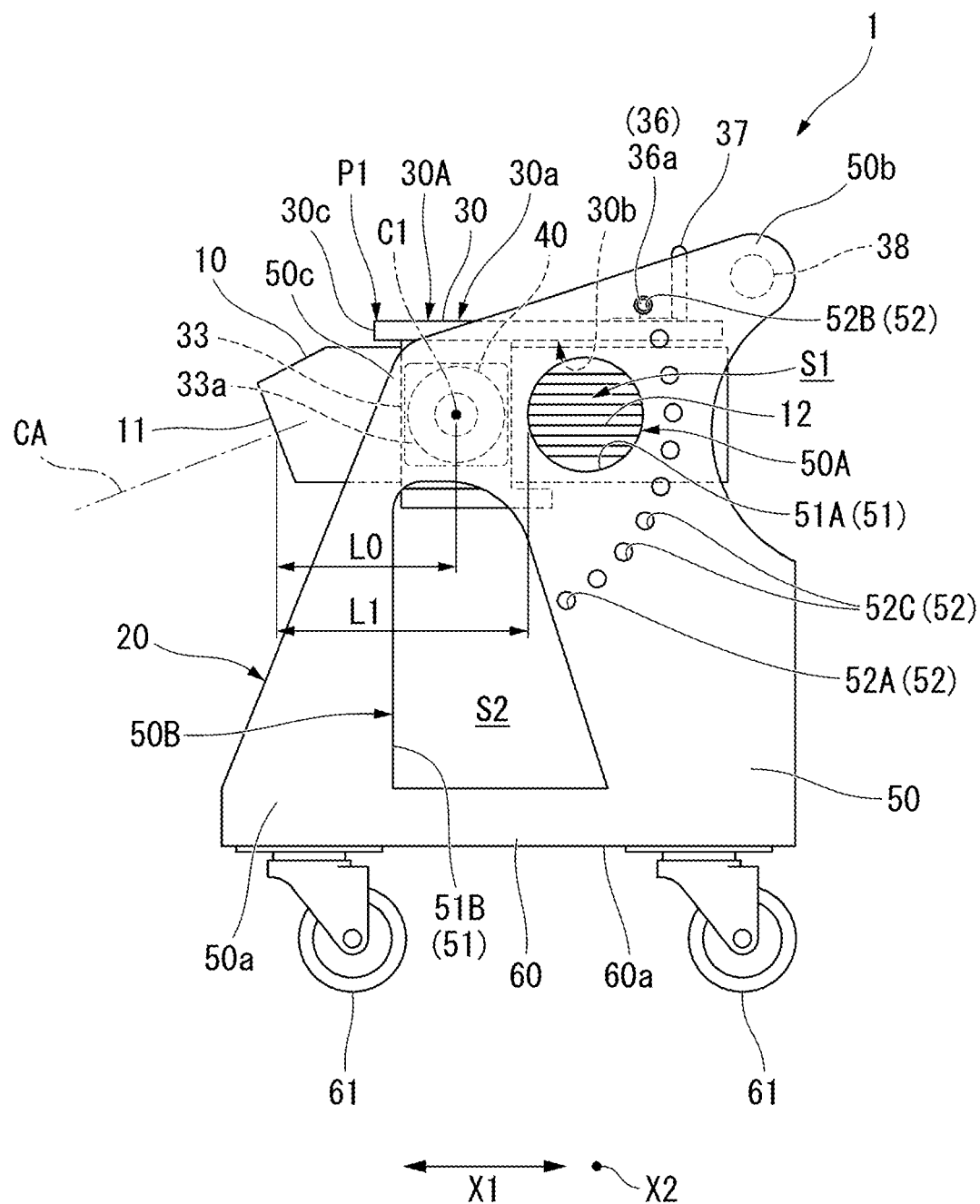
FIG. 5 is a side view at the time when a fixing part is in a first posture in FIG. 4.
Figure 6:
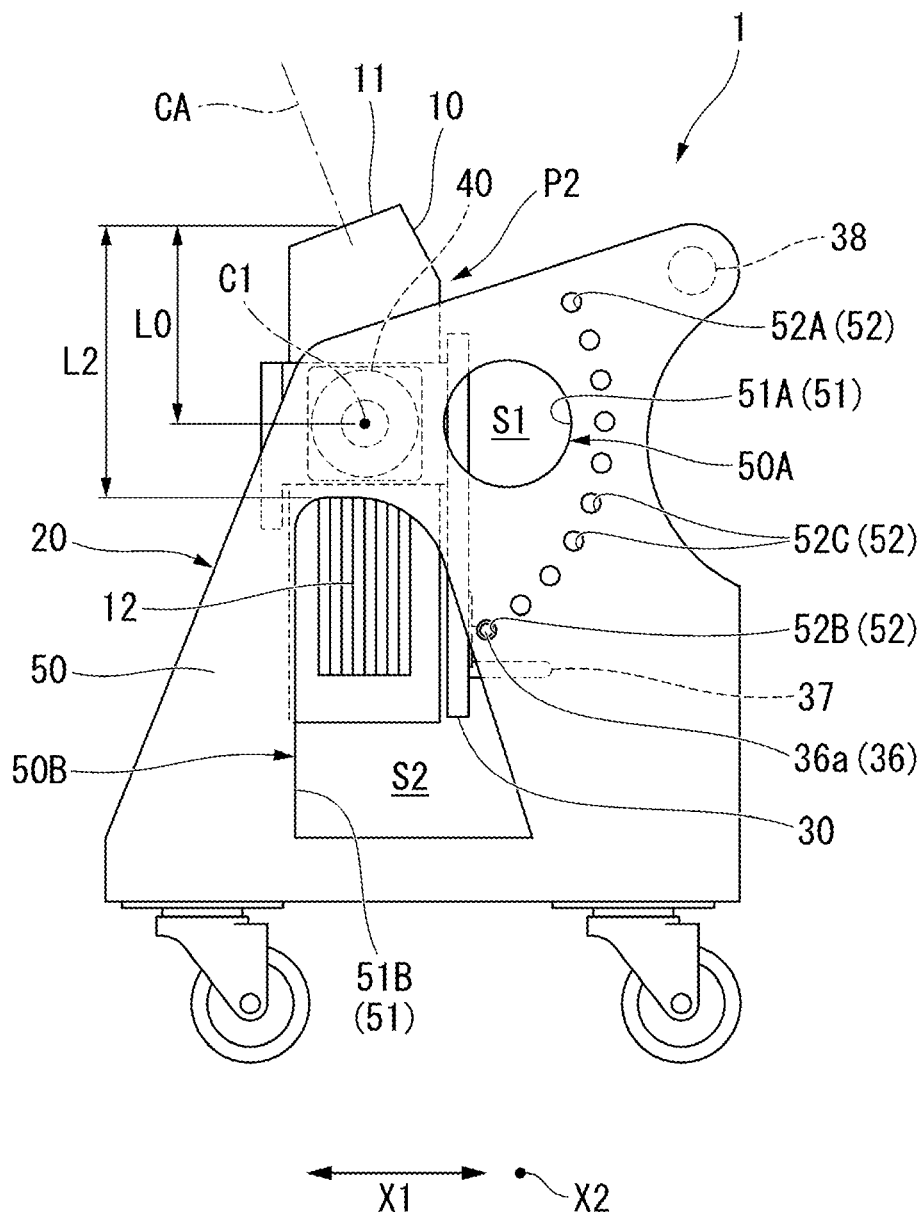
FIG. 6 is a side view at the time when the fixing part is in a second posture in FIG. 4.
Figure 7:
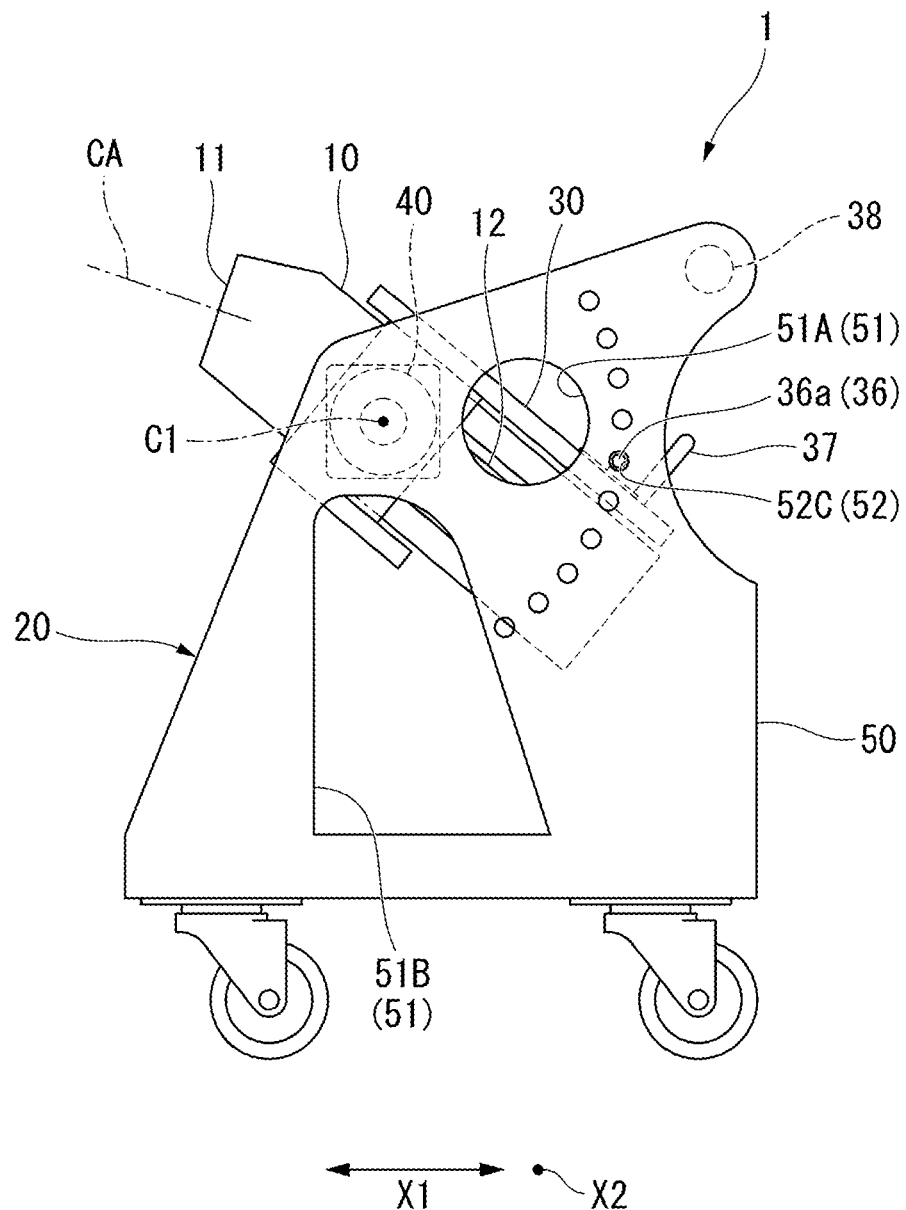
FIG. 7 is a side view at the time when the fixing part is fixed between the first posture and the second posture in FIG. 4.

FIG. 5 is a side view at the time when a fixing part 30 is in a first posture P1. FIG. 6 is a side view at the time when the fixing part 30 is in a second posture P2. FIG. 7 is a side view at the time when the fixing part 30 is fixed between the first posture P1 and the second posture P2. The projection lens 11 is disposed on the front surface 10A. As shown in FIGS. 5 and 6, an exhaust port 12 (an air vent) used for exhaust (ventilation) is provided in a rear side portion of at least one of a pair of left and right side surfaces 10C. Not-shown intake ports used for suction (ventilation) are provided in the side surfaces 10C. The size of the exhaust port 12 is a region from substantially the center to a rear portion in a front-rear direction X1 of the side surfaces 10C. A shape, an area, and a position of the exhaust port 12 of the projector 10 are not limited to this embodiment.

A plurality of screw holes (not shown) for attaching the projector 10 to the fixing part 30 are formed in appropriate positions in the lower surface 10E of the projector 10.

Positions and the number of the screw holes of the projector 10 are not limited to this embodiment either.

As shown in FIGS. 2 and 3, the projector attachment apparatus 20 includes the fixing part 30 having a plate shape that fixes the projector 10, rotating shaft parts 40 that support the fixing part 30 to be rotatable from the first posture P1 to the second posture P2, a pair of side surface plates 50 (side surface parts) that supports the fixing part 30 rotatably via the rotating shaft parts 40 at least in the first posture P1 and the second posture P2 that is at a rotation angle different from a rotation angle in the first posture P1, and a base stand 60 that includes wheels 61 and supports the side surface plates 50 from a lower side in a vertical direction.

In the projector attachment apparatus 20, at the time of the first posture P1 in which the fixing part 30 explained below is set horizontal in a top view, a direction orthogonal to a rotation axis Cl of rotation by the rotating shaft parts 40 is represented as front-rear direction X1, a direction in which the projection lens 11 of the projector 10 is disposed in the front-rear direction X1 is referred to front or a front side, and the opposite side of the direction is referred to rear or a rear side. A direction along the rotation axis Cl is referred to as a left-right direction X2 and a direction circling around the rotation axis Cl is referred to as a circumferential direction.

The fixing part 30 is supported to be rotatable in the circumferential direction from the first posture P1 to the second posture P2 with respect to the pair of side surface plates 50. The fixing part 30 is formed in a plate shape having a fixed thickness and includes a first surface 30a and a second surface 30b that is the opposite surface of the first surface 30a. When the fixing part 30 is in the first posture P1 in which the fixing part 30 is horizontal, the first surface 30a faces upward in the vertical direction and the second surface 30b faces downward in the vertical direction.

As shown in FIG. 2, the projector 10 can be attached to the second surface 30b of the fixing part 30 by fixing screws 31 (attachment parts). The projector 10 is attached to the fixing part 30 in a state in which the lower surface 10E is directed to the second surface 30b. That is, as shown in FIG. 3, the projector 10 is attached in a suspended state from the fixing part 30 in the first posture P1 in which the projector 10 is in a horizontal position and is attached in a state in which the projector 10 is top-bottom inverted, that is, a state in which the upper surface 10D of the projector 10 is facing downward in the vertical direction. The front surface 10A including the projection lens 11 of the projector 10 is provided in a state in which the front surface 10A is further protruded forward than a front end 30c of the fixing part 30 when the projector 10 is attached to the fixing part 30.

Screw holes (not shown) through which the fixing screws 31 can be inserted from the first surface 30a side are provided in the fixing part 30 to pierce through the fixing part 30 in the thickness direction thereof. The positions of the screw holes of the fixing part 30 are set in positions corresponding to screw holes (not shown) formed in the lower surface 10E of the projector 10 attached to the second surface 30b. That is, in the projector attachment apparatus 20, since the fixing screws 31 are screwed into a plurality of screw holes of the lower surface 10E of the projector 10 from the first surface 30a side of the fixing part 30, the projector 10 is fixed in a predetermined position of the fixing part 30.

As shown in FIG. 5, the first posture P1 in the fixing part 30 is a posture in a position where the first surface 30a and the second surface 30b of the fixing part 30 are horizontal. When the fixing part 30 is in the first posture P1, the projector 10 is attached to the second surface 30b of the fixing part 30 such that an axial direction of a projection axis CA faces an obliquely downward direction with respect to a horizontal direction SL. When the fixing part 30 is in the first posture P1, projection light T1 (see FIG. 8) of the projector 10 is projected onto the side surface (the front surface) of the room.

As shown in FIG. 4, the second posture P2 in the fixing part 30 is a posture in which a surface direction of the first surface 30a and the second surface 30b of the fixing part 30 is in a position where a rotation angle θ with respect to the horizontal direction SL is 90 degrees in a posture in which the fixing part 30 rotates in the circumferential direction such that the axial direction of the projection axis CA tilts further upward in the vertical direction than the horizontal. When the fixing part 30 is in the second posture P2, projection light T2 (see FIG. 8) of the projector 10 is projected onto the ceiling surface of the room. Further, in the second posture P2, the center of gravity of the fixing part 30 and the projector 10 is located further on the lower side in the vertical direction than the rotation axis Cl.

As shown in FIG. 3, an auxiliary plate 32 is provided in the fixing part 30 to be spaced apart from the second surface 30b. The auxiliary plate 32 is supported by a pair of left and right coupling plates 33 extending from both sides in the left-right direction X2 of the second surface 30b of the fixing part 30 in a direction separating from the the second surface 30b to thereby be fixed to the fixing part 30. A separation dimension between the second surface 30b of the fixing part 30 and the auxiliary plate 32 is set to be larger than at least a height dimension of the projector 10. An internal space R surrounded by the fixing part 30, the auxiliary plate 32, and the pair of coupling plates 33 is a housing region for the projector 10 attached to the second surface 30b of the fixing part 30. Since both sides in the front-rear direction X1 of the internal space R communicate with the outside, when the projector 10 is attached to and detached from the fixing part 30, the projector 10 can be inserted into and pulled out from the internal space R from the front side or the rear side.

As shown in FIG. 5, the coupling plates 33 are disposed in a position close to the front end 30c of the fixing part 30. On outer surfaces 33a (see FIG. 3) on outer sides in a left-right direction of the coupling plates 33, the rotating shaft parts 40 interposed between the outer surfaces 33a and the side surface plates 50 and serving as the rotation axis Cl of the fixing part 30 are provided. That is, the coupling plates 33 coupled to the fixing part 30 rotate centering on the rotation axis Cl according to rotation of the rotating shaft parts 40. The fixing part 30, the auxiliary plate 32, and the coupling plates 33 are referred to as a fixing unit 30A according to necessity.

As shown in FIG. 3, the rotating shaft parts 40 include first rotating plates 41 coupled to the coupling plates 33 of the fixing unit 30A, second rotating plates 42 provided coaxially with the first rotating plates 41 and coupled to the side surface plates 50, and bearings 43 that are rotated around a center axis between the first rotating plates 41 and the second rotating plates 42. The rotating shaft parts 40 are provided on both left and right sides of the fixing unit 30A. The rotating shaft parts 40 on both the left and right sides are disposed coaxially with the rotation axis Cl.

As shown in FIGS. 2 to 5, the side surface plates 50 are disposed on both the left and right sides across the fixing unit 30A in the left-right direction X2. The side surface plates 50 are configured from plate-like members and provided in a range in which the side surface plates 50 cover, from both the left and right sides, at least the exhaust port 12 of the projector 10 located in a rotation region from the first posture P1 to the second posture P2 in the fixing part 30. The pair of side surface plates 50 are disposed in parallel to each other in a state in which respective plate surfaces thereof cross the rotation axis Cl at a right angle in a top view. The side surface plates 50 are formed such that front lower end portions 50a project forward in a side view and rear upper end portions 50b are further on an upper side in the vertical direction than front upper end portions 50c. Lower ends of the side surface plates 50 are coupled to the base stand 60.

In the projector attachment apparatus 20 in this embodiment, a front plate member 53 that couples the respective front lower end portions 50a of the pair of side surface plates 50 in the left-right direction X2 and faces a forward front is provided. Two speakers 54 are provided in the front plate member 53. The speakers 54 output voice according to an image projected by the projector 10.

The base stand 60 is a plate-like member extending horizontally and couples and supports the lower ends of the pair of left and right side surface plates 50. Four wheels 61 are provided on a lower surface 60a of the base stand 60. The projector attachment apparatus 20 can move on a floor with the wheels 61.

As shown in FIGS. 4 to 6, in the pair of side surface plates 50, openings 51 (51A and 51B) are respectively provided, in a state in which the projector 10 is fixed to the fixing part 30, in a first position 50A opposed to the exhaust port 12 of the projector 10 when the fixing part 30 is in the first posture P1 and a second position 50B opposed to the exhaust port 12 of the projector 10 when the fixing part 30 is in the second posture P2.

As shown in FIG. 5, a first opening 51A is formed in a circular shape in a side view and is disposed on a rear side of the rotation axis Cl (the rotating shaft parts 40). When the fixing part 30 is in the first posture P1, the exhaust port 12 of the projector 10 is exposed in the left-right direction X2 from the first opening 51A and the exhaust port 12 and a space on an outer surface side of the side surface plate 50 communicate through the first opening 51A.

As shown in FIG. 6, a second opening 51B is formed in a substantially trapezoidal shape, a lower side of which is longer than an upper side thereof, in a side view and is disposed on a lower side in the vertical direction of the rotation axis Cl (the rotating shaft parts 40). When the fixing part 30 is in the second posture P2, the exhaust port 12 of the projector 10 is exposed in the left-right direction X2 from the second opening 51B and the exhaust port 12 and the space on the outer surface side of the side surface plate 50 communicate through the second opening 51B. A second opening area S2 of the second opening 51B provided in the second position 50B of the side surface plate 50 is larger than a first opening area S1 of the first opening 51A provided in the first position 50A of the side surface plate 50.

As shown in FIG. 7, when the fixing part 30 is in a posture in which the fixing part 30 is fixed in a position of a rotation angle between the first posture P1 and the second posture P2, an opening is not formed in a position opposed to the exhaust port 12 of the projector 10. However, exhaust is performed using the first opening 51A and the second opening 51B disposed near the exhaust port 12 at this time. Alternatively, even when the fixing part 30 is in the posture in which the fixing part 30 is fixed in the position of the rotation angle between the first posture P1 and the second posture P2, the openings 51A and 51B may be set such that at least a part of the exhaust port 12 of the projector 10 is exposed to at least one of the first opening 51A and the second opening 51B.

As shown in FIG. 5, when the fixing part 30 is in the first posture P1, a distance L0 from the projection lens 11 of the projector 10 to the rotation axis Ci is shorter than a distance L1 from the projection lens 11 to the first opening 51A. As shown in FIG. 6, when the fixing part 30 is in the second posture P2, the distance L0 from the projection lens 11 of the projector 10 to the rotation axis Cl is shorter than a distance L2 from the projection lens 11 to the second opening 51B.

As shown in FIGS. 1 and 4 to 6, in one of the pair of side surface plates 50, a plurality of circular engaging holes 52, 52, . . . are provided at a fixed interval in the circumferential direction along an arc centering on the rotation axis Cl. The engaging holes 52 pierce through the side surface plate 50 in a thickness direction. Positions where the plurality of engaging holes 52 are disposed are positions overlapping a track on which a locking pin 36a of a locking stopper 36 shown in FIG. 2 provided in the fixing part 30 explained below rotates together with the fixing part 30. The plurality of engaging holes 52 are set in positions further on the rear side than the first opening 51A and the second opening 51B of the side surface plate 50, the positions not overlapping the first opening 51A and the second opening 51B. The locking pin 36a of the locking stopper 36 can change the fixing part 30 to a posture at a predetermined rotation angle and fix the fixing part 30 by selectively engaging in any one of the engaging holes 52.

Specifically, the engaging holes 52 include a first engaging hole 52A for fixing the fixing part 30 in the first posture P1, a second engaging hole 52B for fixing the fixing part 30 in the second posture P2, and a plurality of third engaging holes 52C between the first engaging hole 52A and the second engaging hole 52B. The third engaging holes 52C fix the fixing part 30 in postures that are at rotation angles between the first posture P1 and the second posture P2.

In this embodiment, the engaging holes 52 are provided only in one side surface plate 50. However, the engaging holes 52 may be provided in both of the pair of side surface plates 50. In this case, the engaging holes 52 on both the left and right sides are disposed to be coaxial on an axis parallel to the rotation axis Cl. When the engaging holes 52 are provided in the side surface plates 50 on both the left and right sides in this way, the locking stopper 36 is also provided on each of both the left and right sides of the fixing part 30.

An interval in the circumferential direction of the engaging holes 52 adjacent to each other among the plurality of engaging holes 52 provided in one side surface plate 50 and the number of the plurality of engaging holes 52 can be optionally set. A rotation angle of the projector 10 attached to the fixing part 30 can be changed by changing the interval and the number. In this embodiment, the engaging holes 52 are through-holes that pierce through the side surface plate 50. However, the engaging holes 52 are not limited to be the through-holes and may be bottomed holes that do not pierce through the side surface plate 50.

As shown in FIG. 2, the projector attachment apparatus 20 includes, on the first surface 30a of the fixing part 30, the locking stopper 36 including the locking pin 36a capable of projecting in both side directions in the rotation axis Cl direction and a rotation operator 37 for rotating the fixing part 30.

The locking stopper 36 is disposed, in the rear of the first surface 30a of the fixing part 30, in a position close to one side surface plate 50 in which the engaging holes 52 are provided. The locking stopper 36 includes the locking pin 36a capable of moving in the left-right direction X2.

The locking pin 36a is provided to be capable of projecting outward from a side end 30e (see FIG. 3) of the fixing part 30 when viewed from a direction orthogonal to the first surface 30a of the fixing part 30. The locking pin 36a can be manually operated to move forward and backward with a pin operator 36b protruding outward from a part of the locking pin 36a. The locking pin 36a is capable of selectively engaging in any one of the plurality of engaging holes 52 provided in the side surface plate 50. The fixing part 30 is fixed in a posture at a rotation angle at the time when the locking pin 36a engages. When the locking pin 36a is pulled out from the engaging hole 52, the fixing part 30 can be rotated in the circumferential direction around the rotation axis Cl.

As shown in FIG. 2, the rotation operator 37 is provided in a position close to a rear end 30d of the first surface 30a of the fixing part 30. The rotation operator 37 is formed in a C shape and made of a bar-like member and projects from the first surface 30a at height not interfering with a first gripping part 38 explained below when the fixing part 30 is rotated.

Figure 8:
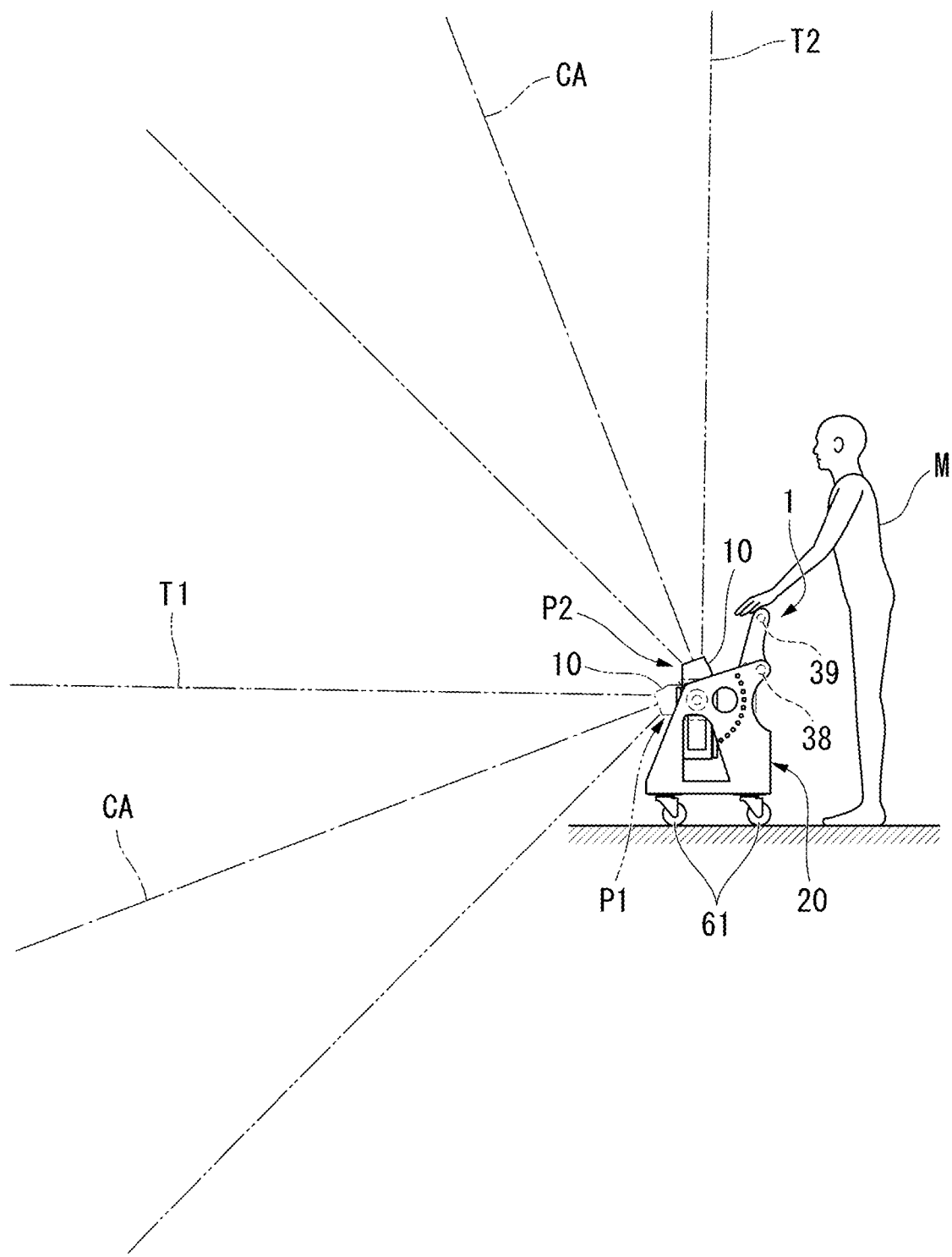
FIG. 8 is a diagram showing ranges of projection lights at the time when the fixing part is in the first posture and the second posture.

As shown in FIG. 1, the first gripping part 38 and a detachable second gripping part 39 located further on the upper side in the vertical direction than the first gripping part 38 are provided in a rear portion of the projector attachment apparatus 20. The first grasping member 38 and the second grasping member 39 are hand-holdable bar-like members extending in the left-right direction X2. FIGS. 1, 4, and 8 are diagrams showing a state in which the second gripping part 39 is attached. FIGS. 2, 3, 5, 6, and 7 are diagrams showing a state in which the second gripping part 39 is detached.

As shown in FIGS. 2 and 4, the first gripping part 38 is fixed in a state in which the first gripping part 38 is coupled to the rear upper end portions 50b of the pair of side surface plates 50 in the left-right direction X2. The first grasping member 38 is disposed on the opposite side of the first surface 30a across the fixing screws 31 provided on the first surface 30a of the fixing part 30 that is in the second posture P2. As explained above, the first gripping part 38 is provided in a position where the first gripping part 38 avoids the rotation operator 37 when the fixing part 30 is rotated in the circumferential direction.

As shown in FIGS. 1 and 4, at the rear upper end portion 50b of each of the pair of side surface plates 50, an arm member 55 extending from the rear upper end portion 50b toward the upper side in the vertical direction is detachably provided. The second gripping part 39 is fixed to a pair of arm members 55 in a state in which upper ends of the arm members 55 are coupled in the left-right direction X2. That is, the second gripping part 39 is located further on the upper side in the vertical direction than the first gripping part 38. When an operator M moves the projector attachment apparatus 20 as shown in FIG. 8, the operator M can move the projector attachment apparatus 20 by holding the first gripping part 38 and the second gripping part 39.

Action of the projector attachment apparatus 20 is explained.

The projector attachment apparatus 20 in this embodiment includes the fixing part 30 including the first surface 30a and the second surface 30b that is the opposite surface of the first surface 30a, the projector 10 being attachably provided on the second surface 30b, and the rotating shaft parts 40 that support the fixing part 30 to be rotatable from the first posture P1 in which the second surface 30b is horizontal to the second posture P2 that is at a rotation angle different from a rotation angle in the first posture P1. The projector 10 is attached to the fixing part 30 such that, in the first posture P1, with respect to the second surface 30b facing the vertical downward direction, the axial direction of the projection axis CA of the projector 10 tilts downward in the vertical direction with respect to the horizontal direction SL. The second posture P2 of the fixing part 30 is in a position rotated 90 degrees with respect to the horizontal direction SL such that the axial direction of the projection axis CA tilts further upward in the vertical direction than the horizontal. Therefore, in this embodiment, since the fixing part 30 to which the projector 10 is attached is provided to be rotatable between the first posture P1, which is in the horizontal position, and the second posture P2 by the rotating shaft parts 40, the projector 10 can be fixed in a position at any rotation angle between the first posture P1 and the second posture P2 to perform projection. In the projector 10 fixed to the fixing part 30, the axial direction of the projection axis CA is tilted downward with respect to the horizontal direction SL in the first posture P1 in which the fixing part 30 is in the horizontal position. Therefore, the axial direction of the projection axis CA of the projection light projected from the projector 10 when the fixing part 30 is in the position of the second posture P2 is tilted forward with respect to the vertical direction. Consequently, even in the second posture P2 in which the projection light is projected in the ceiling direction, the projection light is less easily projected to the side of the operator M present in the rear on the opposite side of a projection portion of the projector 10 in the projector attachment apparatus 20. Therefore, it is possible to prevent the projection light from being directly made incident on the eyes of the operator M. It is possible to prevent the operator M from feeling glare by the projection light. In this embodiment, the projector 10 is attached in a simple attachment structure for attaching the projector 10 to the second surface 30b of the fixing part 30. Therefore, the projector 10 can be attached to the projector attachment apparatus 20 without being limited by the configuration of the projector 10 to be attached. The projector attachment apparatus 20 has universality.

In this embodiment, the second surface 30b of the fixing part 30 is fixed to the lower surface 10E of the projector 10. A general projector is configured to project projection light upward with respect to the horizontal direction SL. In this embodiment, the lower surface 10E of such a general projector 10 is fixed to the second surface 30b of the fixing part 30, whereby the projector 10 is fixed in a vertically inverted state when the fixing part 30 is set in the first posture P1. When the fixing part 30 is in the second posture P2 in which the fixing part 30 is directed in the vertical direction, the axial direction of the projection axis CA of the projection light projected from the projector 10 is inclined forward with respect to the vertical direction.

In this embodiment, the rotation operator 37 for rotating the fixing part 30 is fixed to the fixing part 30. In this case, the operator M can rotate the fixing part 30 by holding the rotation operator 37. Therefore, the operator M can easily perform rotation operation and can easily change the posture of the projector 10.

The projector attachment apparatus 20 according to this embodiment includes the pair of left and right side surface plates 50 in the rotation axis direction that crosses the rotation axis Cl of the fixing part 30 and is supported rotatably with respect to the fixing part 30 via the rotating shaft parts 40, the first gripping part 38 and the second gripping part 39 that are hand-holdable and provided in the side surface plates 50, and the fixing screws 31 provided on the first surface 30a side of the fixing part 30 and for attaching the projector 10 to the second surface 30b. The first gripping part 38 and the second gripping part 39 are disposed on the opposite side of the first surface 30a across the fixing screws 31 provided in the fixing part 30 that is in the second posture P2. In this case, the operator M can move the projector attachment apparatus 20 by holding the first gripping part 38 and the second gripping part 39. In this embodiment, since the first gripping part 38 and the second gripping part 39 are disposed on the opposite side of the first surface 30a across the fixing screws 31 provided in the fixing part 30 that is in the second posture P2, the projection light is not projected to the side of the operator M holding the gripping parts 38 and 39 in the second posture P2. It is possible to more surely prevent the projection light from being made directly incident on the eyes of the operator M.

In the embodiment, the projector attachment apparatus 20 includes the base stand 60 that supports the lower ends of the pair of left and right side surface plates 50 and the wheels 61 provided on the lower surface 60a of the base stand 60. In this case, when the projector 10 attached to the fixing part 30 is moved, since the wheels 61 fixed to the base stand 60 are provided, it is possible to easily carry the projector 10.

In this embodiment, the locking stopper 36 projectable to both the side directions in the rotation axis direction is provided on the first surface 30a of the fixing part 30. In the side surface plate 50, the plurality of engaging holes 52 that engage with the locking stopper 36 are provided in the positions corresponding to the track of the locking stopper 36 that rotates together with the fixing part 30. In this case, the fixing part 30 can be fixed in a posture at a rotation angle at the time when the locking stopper 36 is engaged. The fixing part 30 can be rotated in the circumferential direction around the rotation axis when the locking stopper 36 is pulled out from the engaging hole 52.

In this embodiment, the side surface plate 50 includes the first engaging hole 52A for fixing the fixing part 30 in the first posture P1 and the second engaging hole 52B for fixing the fixing part 30 in the second posture P2. In this case, the fixing part 30 can be surely held in the first posture P1 and the second posture P2.

In this embodiment, the projection system 1 includes the projector attachment apparatus 20 explained above and the projector 10 that projects projection light.

According to at least one embodiment explained above, when projection light is projected upward by the projector 10, since the projection light is not projected to the operator M side, it is possible to prevent the operator M from feeling glare by the projection light.

Several embodiments of the present disclosure are explained above. However, these embodiments are presented as examples and are not intended to limit the scope of the invention. These embodiments can be implemented in other various forms. Various omissions, substitutions, and changes can be made without departing from the gist of the invention. These embodiments and modifications thereof are included in the scope and the gist of the invention and are also included in the inventions described in the claims and the scope of equivalents of the inventions.

In the embodiment explained above, the side surface plates 50 (the side surface parts) only have to cross the rotation axis Cl around which the fixing part 30 rotates. Therefore, the surface direction of the side surface plates 50 may not be orthogonal to the rotation axis Cl unlike in this embodiment.

In this embodiment, the side surface parts in which the openings 51 are provided are the side surface plates 50 disposed on both the sides in the left-right direction X2 across the fixing part 30 (the projector 10). However, the side surface parts are not limited to the side surface plates 50. For example, when the exhaust port 12 of the projector 10 is provided in the rear surface 10B or the upper surface 10D, a rear surface plate or a bottom surface plate (equivalent to the base stand 60 in this embodiment) may be provided on the rear side of the projector attachment apparatus 20 and an opening may be provided in the rear surface plate or the bottom surface plate. In short, the side surface parts are not limited to the side surface plates 50.

In this embodiment, the fixing screws 31 are adopted as components for attaching the projector 10 to the fixing part 30. However, the components are not limited to the fixing screws 31 and other components can also be adopted. In short, the attachment parts only have to be attachment parts provided on the first surface 30a side of the fixing part 30.

The openings provided in the side surface plate 50 are not limited to the configuration in which one opening (the first opening 51A or the second opening 51B) is provided in each of the first posture P1 and the second posture P2 as in the embodiment explained above. For example, the opening may be a set of a large number of holes or may be one opening including both portions opposed to the exhaust ports 12 of the projector 10 in the positions of the first posture P1 and the second posture P2.

A projector attachment apparatus according to an aspect of the present disclosure may have the following configuration.

The projector attachment apparatus according to the aspect of the present disclosure includes: a fixing part including a first surface and a second surface that is an opposite surface of the first surface, a projector being attachably provided on the second surface; and a rotating shaft part configured to support the fixing part to be rotatable from a first posture in which the second surface is horizontal to a second posture that is at a rotation angle different from a rotation angle in the first posture. The projector is attached to the fixing part such that, in the first posture, with respect to the second surface facing a vertical downward direction, an axial direction of a projection axis of the projector tilts downward with respect to a horizontal direction, and the second posture of the fixing part is a position above a horizontal and rotated 90 degrees with respect to the horizontal direction.

In the projector attachment apparatus according to the aspect of the present disclosure, the second surface of the fixing part may be fixed to a lower surface of the projector.

In the projector attachment apparatus according to the aspect of the present disclosure, a rotation operator for rotating the fixing part may be fixed to the fixing part.

The projector attachment apparatus according to the aspect of the present disclosure may further include: a pair of left and right side surface parts in a rotation axis direction that crosses a rotation axis of the fixing part and is supported rotatably with respect to the fixing part via the rotating shaft part; a gripping part provided in the side surface part and hand-holdable; and an attachment part provided on the first surface side of the fixing part and for attaching the projector to the second surface, and the gripping part may be disposed on an opposite side of the first surface across the attachment part provided in the fixing part that is in the second posture.

The projector attachment apparatus according to the aspect of the present disclosure may further include: a base configured to support lower ends of the pair of left and right side surface parts; and wheels provided on a lower surface of the base.

In the projector attachment apparatus according to the aspect of the present disclosure, a locking stopper projectable to both side directions in the rotation axis direction may be provided on the first surface of the fixing part, and, in the side surface part, a plurality of engaging holes that engage with the locking stopper may be provided in positions corresponding to a track of the locking stopper that rotates together with the fixing part.

In the projector attachment apparatus according to the aspect of the present disclosure, the engaging holes may include a first engaging hole for fixing the fixing part in the first posture and a second engaging hole for fixing the fixing part in the second posture.

A projection system according to an aspect of the present disclosure may include the following configuration.

The projection system according to the aspect of the present disclosure includes: the projector attachment apparatus according to the aspect of the present disclosure; and the projector configured to project projection light.

What is claimed is:

1. A projector attachment apparatus comprising:
    an attachment structure including a first surface and a second surface that is an opposite surface of the first surface;
    a pair of side surfaces disposed at both side directions in a rotation axis direction with respect to the attachment structure;
    a gripping provided in the side surface part and hand-holdable;
    a projector attachment provided on the first surface side of the attachment structure and for attaching the projector to the second surface; and
    a rotating shaft configured to support the attachment structure to be rotatable from a first posture in which the second surface is horizontal to a second posture that is at a rotation angle different from a rotation angle in the first posture, wherein
    the second surface is configured to be attached a projector,
    the second surface facing a vertical downward direction in the first posture, an axial direction of a projection axis of the projector tilts downward in a vertical direction with respect to a horizontal direction in the first posture,
    the second posture of the attachment structure is a position rotated 90 degrees with respect to the horizontal direction in the second posture,
    the axial direction of the projection axis tilts upward in the vertical direction than a horizontal in the second posture,
    the pair of side surfaces cross a rotation axis of the attachment structure,
    the pair of side surfaces are supported by the attachment structure via the rotating shaft,
    the pair of side surfaces are rotatable with respect to the attachment structure, and the gripping is disposed on an opposite side of the first surface across the projector attachment provided in the attachment structure that is in the second posture.

2. The projector attachment apparatus according to claim 1, wherein the second surface of the attachment structure is fixed to a lower surface of the projector.

3. The projector attachment apparatus according to claim 1, wherein a rotation operator for rotating the attachment structure is fixed to the attachment structure.

4. The projector attachment apparatus according to claim 1, further comprising:
    a base configured to support lower ends of the pair of side surfaces; and
    wheels provided on a lower surface of the base.

5. The projector attachment apparatus according to claim 1, wherein
    a locking stopper projectable to the both side directions in the rotation axis direction is provided on the first surface of the attachment structure,
    the side surface part includes a first engaging hole engaging with the locking stopper and a second engaging hole engaging with the locking stopper, and
    the first engaging hole and the second engaging hole are provided in positions corresponding to a track of the locking stopper that rotates together with the attachment structure.

6. The projector attachment apparatus according to claim 5, wherein
    the first engaging hole fixes the attachment structure in the first posture, and
    the second engaging hole fixes the attachment structure in the second posture.

7. A projection system comprising:
    the projector attachment apparatus according to claim 1; and
    the projector configured to project projection light.

* * * * *